US 8,849,528 B2

(12) United States Patent
Palmer

(10) Patent No.: US 8,849,528 B2
(45) Date of Patent: Sep. 30, 2014

(54) SYSTEM AND METHOD FOR CONTROLLING A TRANSMISSION

(75) Inventor: Thomas G. Palmer, Brimfield, IL (US)

(73) Assignee: Caterpillar Inc., Peoria, IL (US)

(*) Notice: Subject to any disclaimer, the term of this patent is extended or adjusted under 35 U.S.C. 154(b) by 357 days.

(21) Appl. No.: 13/338,746

(22) Filed: Dec. 28, 2011

(65) Prior Publication Data
US 2013/0173124 A1 Jul. 4, 2013

(51) Int. Cl.
B60W 10/10 (2012.01)
F16H 59/66 (2006.01)
F16H 59/14 (2006.01)

(52) U.S. Cl.
CPC ............. F16H 59/66 (2013.01); F16H 59/14 (2013.01)
USPC .............. 701/55; 701/51; 701/56; 701/60; 477/34; 477/43; 476/1

(58) Field of Classification Search
CPC ......... F16H 59/00; F16H 59/14; F16H 59/36; F16H 59/48; F16H 59/52; F16H 59/60
See application file for complete search history.

(56) References Cited

U.S. PATENT DOCUMENTS

| 4,625,590 | A | 12/1986 | Müller |
| 4,731,727 | A | 3/1988 | Rauch et al. |
| 5,079,705 | A | 1/1992 | Sakai et al. |
| 5,406,862 | A | 4/1995 | Amsallen |
| 5,479,345 | A | 12/1995 | Amsallen |
| 5,510,982 | A | 4/1996 | Ohnishi et al. |
| 5,544,053 | A * | 8/1996 | Nakashima ............... 701/57 |
| 5,598,335 | A * | 1/1997 | You ............................ 701/65 |
| 5,669,847 | A * | 9/1997 | Kashiwabara ............. 477/46 |
| 5,921,883 | A * | 7/1999 | Bellinger ................... 477/33 |
| 5,948,034 | A | 9/1999 | Tihanyi et al. |
| 6,029,107 | A * | 2/2000 | Sato .......................... 701/58 |
| 6,236,928 | B1 * | 5/2001 | Loffler et al. ............. 701/82 |
| 6,269,296 | B1 * | 7/2001 | Toukura et al. ........... 701/80 |
| 6,339,749 | B1 * | 1/2002 | Rieker et al. ............ 702/173 |
| 6,368,247 | B1 * | 4/2002 | Kondo ....................... 477/47 |
| 7,499,784 | B2 | 3/2009 | Kresse |
| 8,265,839 | B2 * | 9/2012 | Poisson et al. ............ 701/60 |
| 8,527,163 | B2 * | 9/2013 | Staudinger et al. ...... 701/51 |
| 2002/0041167 | A1* | 4/2002 | Kitano et al. ............ 318/3 |
| 2004/0002806 | A1* | 1/2004 | Bellinger ................ 701/104 |
| 2004/0014558 | A1* | 1/2004 | Ibamoto et al. ......... 477/45 |
| 2004/0097328 | A1* | 5/2004 | Makiyama et al. ...... 477/43 |
| 2004/0167705 | A1* | 8/2004 | Lingman et al. ......... 701/124 |
| 2006/0064225 | A1* | 3/2006 | Tabata et al. ............ 701/96 |
| 2007/0083314 | A1* | 4/2007 | Corigliano et al. ...... 701/80 |
| 2007/0162210 | A1* | 7/2007 | Kitaori et al. ........... 701/51 |

(Continued)

Primary Examiner — Jonathan M Dager
(74) Attorney, Agent, or Firm — Finnegan, Henderson, Farabow, Garrett & Dunner, LLP

(57) ABSTRACT

A system for selecting shift schedules of a transmission of a vehicle includes a controller configured to receive a signal indicative of acceleration of the vehicle prior to a change of a gear of the transmission. The controller is further configured to estimate tractive effort of the vehicle following the change of the gear of the transmission, the tractive effort estimation being based on at least an estimation of a road load on the vehicle. The controller is further configured to select between a first shift schedule and a second shift schedule based on the tractive effort estimation, wherein, if the tractive effort estimation is less than a threshold value, the controller selects the first shift schedule, and if the tractive effort estimation is at least equal to the threshold value, the controller selects the second shift schedule.

20 Claims, 4 Drawing Sheets

(56) References Cited

U.S. PATENT DOCUMENTS

| | | | |
|---|---|---|---|
| 2008/0167161 A1* | 7/2008 | Mitchell et al. | 477/94 |
| 2008/0201047 A1* | 8/2008 | Eisele et al. | 701/65 |
| 2008/0249693 A1* | 10/2008 | Kresse | 701/61 |
| 2009/0024354 A1* | 1/2009 | Osaki et al. | 702/154 |
| 2009/0043428 A1* | 2/2009 | Matsunaga et al. | 701/1 |
| 2009/0043473 A1* | 2/2009 | Nakai et al. | 701/70 |
| 2009/0215586 A1* | 8/2009 | Kresse | 477/110 |
| 2009/0216415 A1* | 8/2009 | Iwatsuki et al. | 701/70 |
| 2010/0082208 A1 | 4/2010 | Asai et al. | |
| 2010/0121543 A1* | 5/2010 | Landes et al. | 701/54 |
| 2010/0305822 A1* | 12/2010 | Kresse et al. | 701/56 |
| 2011/0153173 A1* | 6/2011 | Wolfgang et al. | 701/58 |
| 2011/0307154 A1* | 12/2011 | Takeda et al. | 701/70 |
| 2012/0136506 A1* | 5/2012 | Takeuchi et al. | 701/1 |
| 2012/0221228 A1* | 8/2012 | Noumura et al. | 701/110 |
| 2012/0296538 A1* | 11/2012 | Kresse | 701/54 |
| 2013/0190945 A1* | 7/2013 | Koto et al. | 701/1 |
| 2013/0345902 A1* | 12/2013 | Papajewski et al. | 701/1 |

* cited by examiner

SYSTEM AND METHOD FOR CONTROLLING A TRANSMISSION

TECHNICAL FIELD

The present disclosure relates generally to a system and method for controlling a transmission and, more particularly, to a system and method for selecting shift schedules of a transmission.

BACKGROUND

Vehicles may include a transmission coupled to an engine in order to provide more flexible use of the power output of the engine. The transmission may provide a number of gear ratios that enable the vehicle to travel at relatively wide range of speeds or conditions that might be impractical without a transmission. Some transmissions are configured to change gear ratios automatically in order to improve the ease of operation of the vehicle as it is operated through its speed range.

The circumstances under which the transmission shifts gears may affect the efficiency of operation of the vehicle. For example, the time at which the transmission shifts gears and the gears selected by the transmission may result in operating the engine at more efficient engine speeds and power outputs. For example, in general, it is more efficient to operate an engine at relatively lower engine speeds for a given power output. However, under certain conditions, it may be preferable to operate an engine in a range of engine speeds that result in relatively higher engine performance at the expense of efficiency. For example, if the vehicle is heavily loaded and/or travelling up a relatively steep or long grade, it may be preferable for the transmission to select gear ratios that provide improved performance even if efficiency may suffer. As a result, it may be desirable to operate the transmission under certain conditions so that the efficiency of the vehicle is improved, while under other conditions, so that the performance of the vehicle is improved.

A method for selecting a shift schedule for a transmission in a motor vehicle is disclosed in U.S. Pat. No. 7,499,784 B2 to Kresse ("the '784 patent"). In particular, the method disclosed in the '784 patent includes the steps of determining whether a signal-to-noise ratio exceeds a threshold and calculating a tractive effort of the motor vehicle. The method thereafter includes estimating vehicle mass and road grade from the tractive effort using a recursive least squares estimator with multiple forgetting when the signal-to-noise ratio exceeds the threshold. When the signal-to-noise ratio does not exceed the threshold, vehicle mass is selected, and the road grade is estimated from the vehicle mass and tractive effort. Thereafter, the method includes selecting a shift schedule based on the vehicle mass and the estimated road grade.

Although the method disclosed in the '784 patent includes selecting a shift schedule based on estimations of the vehicle mass and road grade, the manner in which the estimations are carried out may suffer from a number of possible drawbacks. For example, the estimations may lack accuracy due, for example, to reliance on assumptions that are inaccurate. Therefore, it may be desirable to provide a system and method for controlling a transmission that selects shift schedules for the transmission in a more desirable manner.

SUMMARY

In one aspect, the present disclosure includes a system for selecting shift schedules of a transmission of a vehicle configured to change gears according to two or more shift schedules. The system includes a controller configured to receive a signal indicative of acceleration of the vehicle prior to a change of gears of the transmission. The controller is further configured to estimate tractive effort of the vehicle following the change of gear of the transmission, the tractive effort estimation being based on at least an estimation of a road load on the vehicle. The controller is further configured to select between a first shift schedule and a second shift schedule based on the tractive effort estimation, wherein, if the tractive effort estimation is less than a threshold value, the controller selects the first shift schedule, and if the tractive effort estimation is at least equal to the threshold value, the controller selects the second shift schedule.

According to another aspect, a method of selecting shift schedules of a transmission of a vehicle configured to change gears according to two or more shift schedules, includes measuring acceleration of the vehicle prior to changing a gear of the transmission. The method further includes estimating tractive effort of the vehicle after changing the gear of the transmission, wherein estimating the tractive effort includes at least estimating a road load of the vehicle. The method further includes selecting between a first shift schedule and a second shift schedule based on the estimated tractive effort, wherein, if the estimated tractive effort is less than a threshold value, the first shift schedule is selected and changing the gear of the transmission is delayed, and if the estimated tractive effort is at least equal to the threshold value, the second shift schedule is selected and changing the gear of the transmission is initiated.

According to a further aspect, a vehicle includes a chassis, an engine coupled to the chassis, a transmission coupled to the engine and configured to change gears according to two or more shift schedules, and a controller. The controller is configured to receive a signal indicative of acceleration of the vehicle prior to a change of a gear of the transmission, and estimate tractive effort of the vehicle following the change of a gear of the transmission, the tractive effort estimation being based on at least an estimation of a road load on the vehicle. The controller is further configured to select between a first shift schedule and a second shift schedule based on the tractive effort estimate, wherein, if the tractive effort estimate is less than a threshold value, the controller selects the first shift schedule, and if the tractive effort estimation is at least equal to the threshold value, the controller selects the second shift schedule.

DETAILED DESCRIPTION

Figure 1:
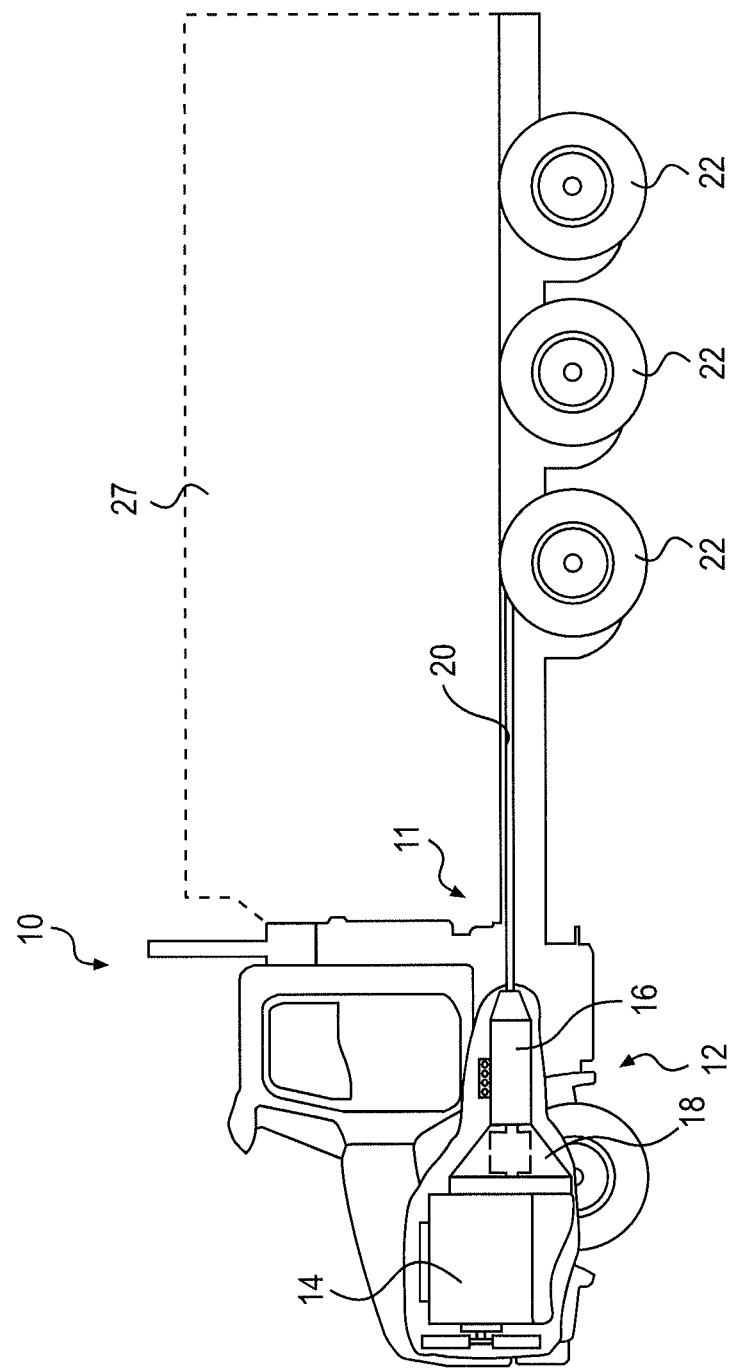
FIG. 1 is a schematic side view of an exemplary embodiment of a vehicle.

FIG. 1 shows an exemplary embodiment of a vehicle 10. Exemplary vehicle 10 shown in FIG. 1 is an on-highway truck. However, vehicle 10 may be a mobile machine that performs some type of operation associated with an industry, such as mining, construction, farming, transportation, or any other industry known in the art. For example, vehicle 10 may be an earth moving machine such as an off-highway haul truck, a wheel loader, a motor grader, or any other suitable earth moving machine. Vehicle 10 may alternatively be a passenger vehicle.

Figure 2:
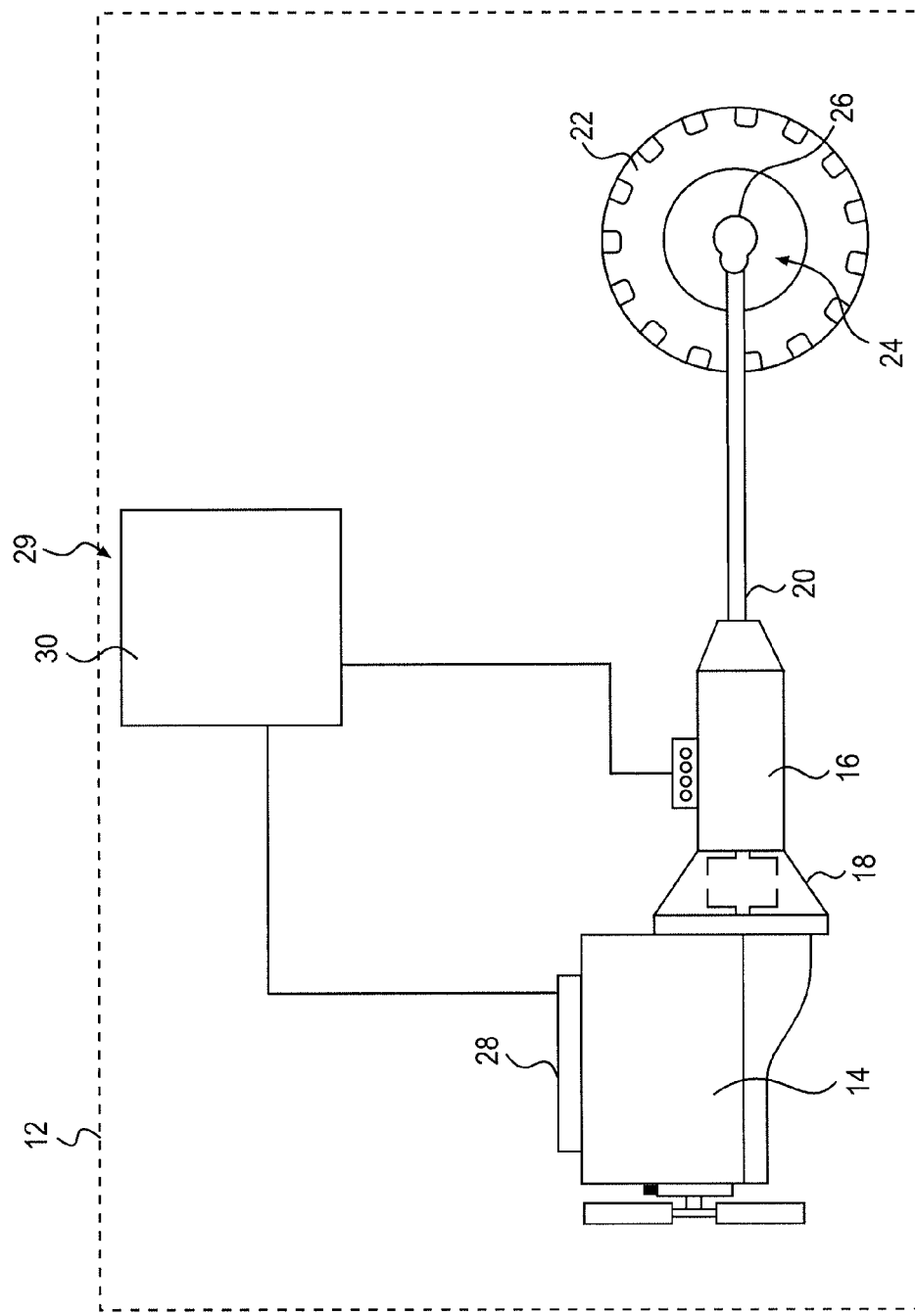
FIG. 2 is a schematic view of an exemplary embodiment of a powertrain.

Exemplary vehicle 10 includes a chassis 11 and a powertrain 12. As shown in FIGS. 1 and 2, exemplary powertrain 12 includes an engine 14 coupled to a transmission 16 via, for example, a torque converter 18. In particular, an output shaft (not shown) of engine 14 may be coupled to an input shaft (not shown) of torque converter 18, and an output shaft (not shown) of torque converter 18 may be coupled to an input shaft (not shown) of transmission 16. An output shaft (not shown) of transmission 16 may be coupled to a drive shaft 20, which, in turn, may be coupled to one or more traction devices 22 (e.g., wheels and/or ground engaging tracks) via a final drive 24 including, for example, a differential 26. As shown in FIG. 1, exemplary vehicle 10 includes a body 27.

During operation of exemplary powertrain 12, engine 14 supplies rotational power to the input shaft of torque converter 18, which transfers the rotational power via its output shaft to the input shaft of transmission 16. Transmission 16 transfers the rotational power via its output shaft to drive shaft 20, which transfers the rotational power to traction devices 22 via final drive 24 and differential 26, thereby propelling exemplary vehicle 10.

Exemplary engine 14 may include any internal combustion engine, such as, for example, a compression-ignition engine, a spark-ignition engine, a gas turbine engine, a gaseous fuel-powered engine, or any other engines known to those skilled in the art. Alternatively, or in addition, engine 14 may include or be supplemented by a non-combustion source of power, such as, for example, an electric motor, a hydraulic motor, a fly-wheel-powered motor, a fuel cell, or any other known non-combustion source of power.

Exemplary torque converter 18 may be a hydro-mechanical device configured to couple engine 14 to transmission 16. For example, torque converter 18 may conduct pressurized fluid between the output shaft of engine 14 and the input shaft of transmission 16 to thereby drive transmission 16, while still allowing engine 14 to rotate independently of transmission 16 under certain circumstances. In addition, exemplary torque converter 18 may include a lockup clutch for directly, mechanically coupling the output shaft of engine 14 to the input shaft of transmission 16. In this exemplary arrangement, torque converter 18 may selectively absorb and multiply the torque transferred between engine 14 and transmission 16 by either allowing or preventing slippage between the output shaft rotation of engine 14 and the input shaft rotation of transmission 16. It is contemplated that torque converter 18 may alternatively include a non-hydraulic device, such as, for example, a mechanical diaphragm clutch.

Exemplary transmission 16 may include a number of components configured to interact and transmit power from engine 14 to drive shaft 20. For example, transmission 16 may include a multi-speed, bi-directional, mechanical transmission configured to provide a neutral gear ratio, a plurality of forward gear ratios, and one or more reverse gear ratios, wherein the gear ratios represent a ratio of the speed of the input shaft to the speed of the output shaft of transmission 16. For example, transmission 16 may include a plurality of planetary gear mechanisms (not shown) and a plurality of clutches (not shown) configured to interact to provide the neutral, forward, and reverse gear ratios. The clutches may be selectively operated to interact with the combination of the components of the planetary gear mechanisms in a manner that results in desired gear ratios or neutral. Alternative types of transmissions known to those skilled in art are contemplated.

Exemplary transmission 16 may be an automatic transmission, where, for example, it is not necessary for the operator of exemplary vehicle 10 to initiate every change in the gear ratios of transmission 16. For example, once an operator selects a mode of transmission operation (e.g., forward or reverse), transmission 16 will change gear ratios without interaction of the operator.

According to some embodiments, changing gear ratios of transmission 16 may be initiated based on one or more shift schedules configured to change gear ratios based on one or more of throttle input, engine speed, vehicle mass, vehicle payload, road grade, and/or road load (e.g., resistance to motion based on parameters including, for example, aerodynamic drag, rolling resistance, and mechanical resistance), as explained in more detail herein. For example, operating transmission 16 according to different shift schedules may result in transmission 16 changing gear ratios at different engine speeds in order to provide performance closely tailored to the current operating conditions of vehicle 10.

Exemplary powertrain 12 may include a controller 28 configured to control operation engine 14, and a system 29 including a controller 30 configured to control operation of transmission 16. In the exemplary embodiment shown in FIG. 2, engine controller 28 and transmission controller 30 are separate from one another. However, it is contemplated that engine controller 28 and transmission controller 30 may be integrated into a single assembly or housing. Engine controller 28 may be configured to receive signals relating to operator inputs and/or from sensors associated with engine 14, and control operation of engine 14, including power output, torque output, and/or engine speed. Transmission controller 30 may be configured to control operation of transmission 16 based on signals relating to operator inputs, signals from sensors associated with engine 14, signals from engine controller 28, signals from torque converter 18 (e.g., the speed of the input shaft and/or output shaft of torque converter 18), as well as other sources associated with vehicle 10. In this exemplary manner, engine controller 28 and transmission controller 30 may operate in coordinated manner to control operation of powertrain 12, including engine 14 and transmission 16.

Engine controller 28 and/or transmission controller 30 may include a single microprocessor or multiple microprocessors configured to control operation of engine 12 and transmission 16, respectively. For example, engine controller 28 and/or transmission controller 30 may include one or more processors, microprocessors, central processing units, on-board computers, electronic control modules, and/or any other computing and control devices known to those skilled in the art. Engine controller 28 and/or transmission controller 30 may be configured run one or more software programs or applications stored in a memory location, read from a computer-readable medium, and/or accessed from an external device operatively coupled to engine controller 28 and transmission controller 30 by any suitable communications network. Various other known circuits may be associated with engine controller 28 and/or transmission controller 30, including power supply circuitry, signal-conditioning circuitry, solenoid driver circuitry, communication circuitry, and other appropriate circuitry.

Figure 3:
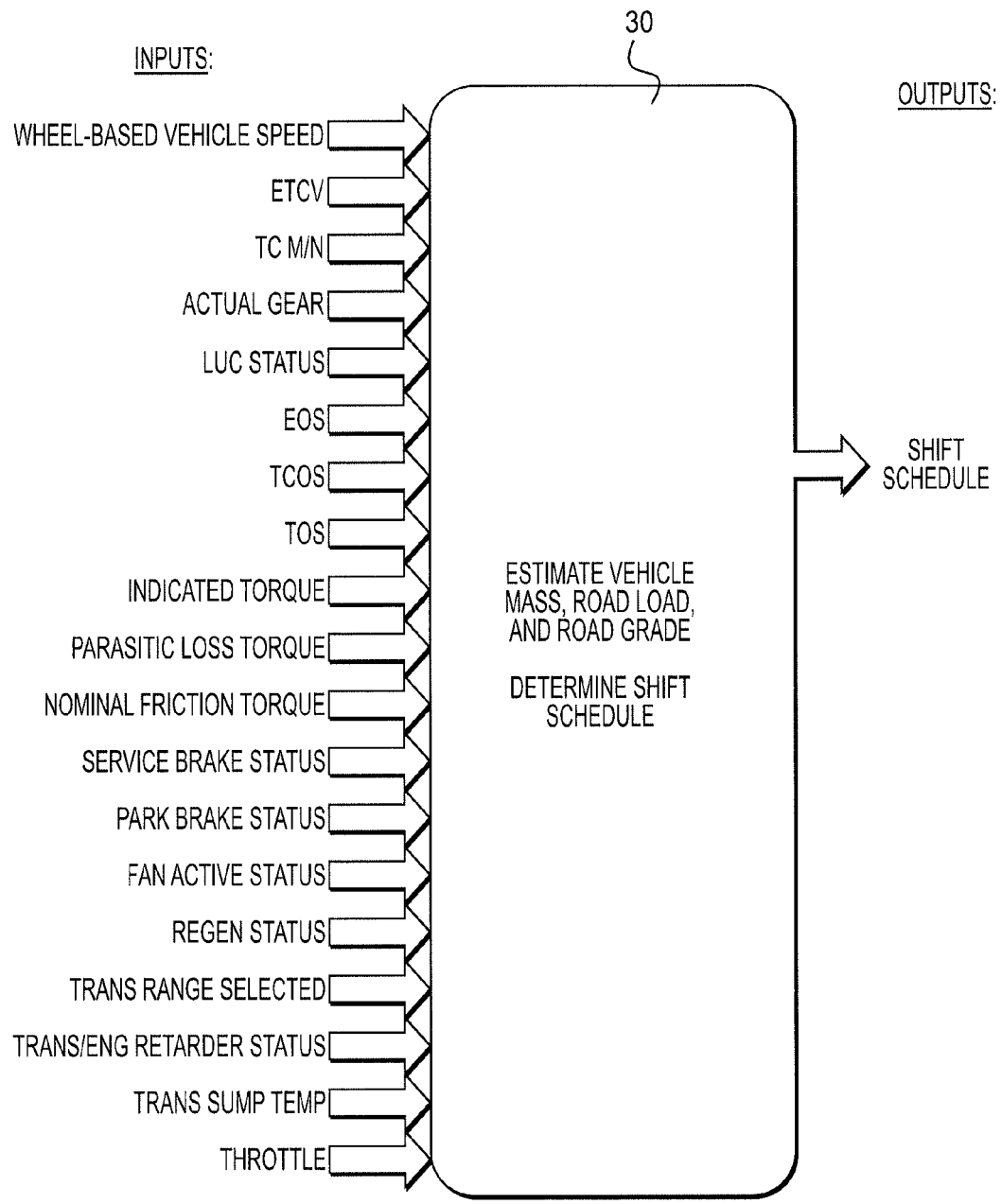
FIG. 3 is a schematic view of exemplary inputs and outputs of an exemplary embodiment of a system for selecting shift schedules of a transmission.

As shown in FIG. 3, transmission controller 30 may be configured to receive signals and select a shift schedule stored in transmission controller 30 (or accessible by transmission controller 30 via hard-wire link or wireless link) to control operation of transmission 16. For example, a shift schedule may include information sufficient for transmission controller 30 to determine the engine speed at which transmission 16 changes gear ratios for each of the gear ratios and send signals to transmission 16 to initiate the change in gear ratios. According to some embodiments, a shift schedule includes a table of desired shift points based one or more of the output shaft speed, throttle modulation, and current gear. Different shift schedules may result in at least some of the gear changes occurring at different engine speeds relative to corresponding gear changes according to other shift schedules. For example, according to a first shift schedule, transmission controller 30 may initiate a change from a first gear to a second gear at a first engine speed (e.g., 3,000 rpm). In contrast, according to a second shift schedule, transmission controller 30 may initiate the change from the first gear to the second gear at a different engine speed (e.g., 2,500 rpm) that is lower than the engine speed at which the change from the first gear to the second gear is made according to the first shift schedule.

According to some embodiments, engine controller 30 may be configured to change gear in transmission 16 according to a plurality of shift schedules tailored to different operating conditions of vehicle 10. For example, transmission controller 30 may be configured change gears according to a first shift schedule (e.g., a performance shift schedule) corresponding to higher performance of vehicle 10. Such a shift schedule may result in engine 14 operating at relatively higher engine speeds prior to changing to the next higher gear. This may be advantageous when, for example, vehicle 10 is carrying a higher payload, pulling a trailer, and/or operating on a relatively steep grade or incline. By operating engine 14 at relatively higher engine speeds prior to changing to the next higher gear, vehicle 10 may exhibit improved performance as a result of engine 14 operating at consistently higher engine speeds, which may correspond more closely to higher torque and power output of engine 14.

According to some embodiments, transmission controller 30 may be configured to change gears according to a second shift schedule (e.g., an economy shift schedule) corresponding to a higher efficiency of operating vehicle 10. Such a shift schedule may result in engine 14 operating consistently at relatively lower engine speeds (i.e., relative to the performance shift schedule) prior to changing to the next higher gear. This may be advantageous when, for example, vehicle 10 is carrying a lighter payload and/or operating on relatively level terrain. By operating engine 14 at relatively lower engine speeds consistent with reduced fuel consumption prior to changing to the next higher gear ratio, vehicle 10 may exhibit improved efficiency.

As shown in FIG. 3, exemplary transmission controller 30 is configured to receive signals and select a shift schedule based on at least some of the received signals. The signals may be received from engine controller 28 and/or sensors (not shown) associated with various components of vehicle 10. According to some embodiments, transmission controller 30 is configured to receive the signals and estimate one or more of vehicle mass, road grade, and road load. Based on these estimation(s), transmission controller 30 may estimate tractive effort, or the pulling force exerted by vehicle 10 during operation. According to some embodiments, transmission controller 30 may be configured to compare the estimated tractive effort with the maximum available power of vehicle 10 at the current vehicle speed. If the estimated tractive effort is less than a threshold, or percentage of the maximum available power at the current speed, transmission controller 30 may be configured to change gear ratios in transmission 16 according to a first shift schedule corresponding to higher performance (e.g., a performance shift schedule). For example, if the estimated tractive effort is less than, for example, about 30% of the maximum available power at the current vehicle speed, transmission controller 30 may be configured to change gears in transmission 16 according to a first shift schedule corresponding to higher performance. On the other hand, if the estimated tractive effort is greater than or equal to, for example, about 30% of the maximum available power at the current vehicle speed, transmission controller 30 may be configured to change gears in transmission 16 according to a second shift schedule corresponding to higher efficiency (e.g., an economy shift schedule).

As shown in FIG. 3, transmission controller 30 may be configured to receive one of more of the following signals: wheel-based vehicle speed (WHEEL-BASED VEHICLE SPEED), engine torque curve values (ETCV), torque converter model number (TC M/N), torque converter lock-up clutch status (LUC STATUS), the actual gear of transmission (ACTUAL GEAR), engine speed (EOS), torque converter output speed (TCOS), transmission output shaft speed (TOS), current engine torque (INDICATED TORQUE), engine torque loss due to parasitic torque consumers (e.g., fan and accessories) (PARASITIC LOSS TORQUE), nominal friction torque loss of engine at current speed (NOMINAL FRICTION TORQUE), service brake status (SERVICE BRAKE STATUS), parking brake status (PARKING BRAKE STATUS), engine fan status (FAN ACTIVE STATUS), status of exhaust particulate filter regeneration (REGEN STATUS), transmission range status (i.e., drive/neutral/reverse) (TRANS RANGE SELECTED), transmission retarder or engine brake status (TRANS/ENG RETARDER STATUS), transmission sump temperature (TRANS SUMP TEMP), and accelerator pedal position (THROTTLE). As explained in more detail below, exemplary transmission controller 30 may be configured to use one or more of these signals to estimate tractive effort and determine the maximum available power at the current vehicle speed. For example, transmission controller 30 may estimate one or more of the mass of vehicle 10, the road load on vehicle 10, and the grade of the road on which vehicle 10 is travelling. Based on these estimations, transmission controller 30 may estimate tractive effort and select a shift schedule for operation of transmission 16, as explained above.

According to some embodiments, transmission controller 30 may estimate tractive effort according to the following exemplary process. Transmission controller 30 may estimate (e.g., predict prior to occurrence) the tractive effort following the change from a first gear ratio to a second gear ratio during movement of vehicle 10. First, the engine speed following the change in gear ratios is estimated (e.g., predicted) based on vehicle speed and/or the gear ratios, which may be known. Next, the difference between the power output prior to the gear ratio change and after (e.g., immediately after) the gear ratio change is estimated. The current power output of engine 14 may be determined based on a torque map or may be available from engine controller 28. Using an initially-guessed (or previously known) vehicle mass, the tractive effort following the gear ratio change is estimated (e.g., predicted) based on the following equations:

$$F_1 = m \times a_1; \quad F_2 = m \times a_2; \quad F_2 = F_1 - (P_1 - P_2)/(v \times k); \text{ and}$$

$$F_{rollresist} = m \times (0.005 + (4.1 + 0.041 \times v) \times 10^{-3})[lbf],$$

where $F_1$ is the driving force prior to the gear ratio change, $a_1$ is the acceleration of vehicle 10 prior to the gear ratio change, m is the total mass of vehicle 10, $F_2$ is the estimated tractive effort or driving force after the gear ratio change, $a_2$ is the estimated acceleration of vehicle 10 after the gear ratio change, $P_1$ is the power output prior to the gear ratio change, $P_2$ is the estimated tractive power or power output after the gear ratio change, v is the current speed of vehicle 10, k is a constant (e.g., 375) that varies depending on the units used for the calculations, and $F_{rollresist}$ is the force on vehicle 10 due to rolling resistance.

According to some embodiments, if the estimated acceleration $a_2$ is greater than a predefined threshold, or the estimated acceleration $a_2$ is greater than or equal to $k \times a_1$, and $a_1$ is greater than 0, transmission controller 30 may be configured to select a shift schedule that permits the change from the first gear ratio to the second gear ratio to occur (e.g., according to an economy shift schedule). On the other hand, if the estimated acceleration $a_2$ is less than the predefined threshold, or the estimated acceleration $a_2$ is less than $k \times a_1$, or $a_1$ is less than or equal to 0, transmission controller 30 may be configured to select a shift schedule that delays the change from the first gear ratio to the second gear ratio until the estimated acceleration $a_2$ is greater than a predefined threshold, or the estimated acceleration $a_2$ is greater than or equal to $k \times a_1$, and $a_1$ is greater than 0 (e.g., according to a performance shift schedule).

According to some embodiments, if the estimated tractive effort $F_2$ following the gear ratio change is greater than or equal to a predefined threshold, transmission controller 30 may be configured to select a shift schedule that permits the change from the first gear ratio to the second gear ratio to occur (e.g., according to an economy shift schedule). On the other hand, if the estimated tractive effort $F_2$ is less than the predefined threshold, transmission controller 30 may be configured to select a shift schedule that delays the change from the first gear ratio to the second gear ratio until the estimated tractive effort $F_2$ following the gear ratio change is greater than or equal to the predefined threshold (e.g., according to a performance shift schedule).

According to some embodiments, if transmission controller 30 prevents the gear ratio change, transmission controller 30 may be configured to repeat the above-outlined process if a gear ratio change was prevented just prior to any other shift point (i.e., the engine speed at which a gear ratio change occurs according to a shift schedule) according to the economy shift schedule, or until the engine speed is above the shift point according to the performance shift schedule.

According to some embodiments, once the change in gear ratios is permitted, transmission controller 30 may calculate or receive a signal indicative of the vehicle acceleration $a_2$ following the gear ratio change (e.g., immediately following the gear ratio change). Transmission controller 30 may thereafter adjust the value of the initial estimate of vehicle mass m used in the above-noted equations, and repeat this adjustment during a number of gear ratio changes until the estimated vehicle mass m converges to within a predetermined estimate range. The predetermined estimate range may be such that the adjusted values of vehicle mass m for a number of consecutive calculations is within about, for example, plus or minus 5%. Other estimate ranges are contemplated.

According to some embodiments, transmission controller 30 may be configured to use the following equations to estimate tractive effort, vehicle mass, road load on vehicle 10, and/or road grade:

$$F = m \times a; \quad P_{tract} = (m \times a \times v)/k; \text{ and } P_{tract} = P_{wheel} - P_{roadload} - P_{grade},$$

where F is tractive force, m is vehicle mass, a is vehicle acceleration, k is a constant based on the units used in the equation (e.g., 375), $P_{tract}$ is tractive power, $P_{wheel}$ is the current available power at traction devices 22 (e.g., wheels), which may be calculated by subtracting powertrain power losses from the torque output from engine 14, transmission 16, final drive 24, and differential 26, which may be provided from engine controller 28 or determined based on correlations (e.g., maps, equations, and/or estimates based on vehicle applications) relating engine torque, engine speed, and/or throttle setting. $P_{roadload}$ may include the power required to overcome resistance to motion based on parameters including, for example, aerodynamic drag, rolling resistance, and mechanical resistance. $P_{grade}$ is the power required to overcome the grade of the terrain on which vehicle 10 is travelling.

An equation for determining tractive force F is as follows:

$$m \times a = (T_e - (J_e \times \alpha))/r_g - F_{fb} - F_{aero} - F_{rollresist} - F_{grade},$$

where m is the mass of vehicle 10, a is the acceleration of vehicle 10, $T_e$ is the engine torque at the flywheel, $J_e$ is the powertrain inertia, $\alpha$ is the rotational acceleration of engine 14, $r_g$ is the total gear ratio at the traction devices 22, $F_{fb}$ is the force from braking (assumed to be zero when, for example, the service brake and retarder status broadcast on the vehicle bus indicates that the service brake and the retarder are off), $F_{aero}$ is the aerodynamic drag on vehicle 10, $F_{rollingresist}$ is the rolling resistance force on vehicle 10, and $F_{grade}$ is the force resulting from the grade of the terrain on which vehicle 10 is traveling.

According to some embodiments, one or more of the equations above may be used by transmission controller 30 to estimate the mass m of vehicle 10. For example, the vehicle mass may be estimated at low speeds, for example, speeds below 10 mph. The road grade may be assumed to be equal to zero. At low speeds, the aerodynamic drag $F_{aero}$ may be assumed to approach zero. It may be assumed the braking force is equal to zero, and the rolling resistance may be (1) estimated to be about 0.02 multiplied by the vehicle mass m, or (2) calculated using the equation previously defined herein for determining the force $F_{rollresist}$ due to rolling resistance. Thus, the equations above may be used to estimate vehicle mass m.

According to some embodiments, the road load may be estimated during 0% throttle coasting events immediately following a tractive event, or during deceleration of vehicle 10 by holding the current road grade estimate. For example, the following equation may be used to estimate road load as a function of vehicle speed:

$$P_{roadload} = m \times (-a) \times (v/k) = P_{chargepump} + P_{transmloss} + P_{DTloss} + (\tau_{nonfriction} + \tau_{parasitic}) \times N/c,$$

where $P_{roadload}$ may include the power loss due to the road load on vehicle 10, m is vehicle mass, a is the rate of vehicle deceleration, v is vehicle speed, k is a constant (e.g., 375) based on the units used in the equation, $P_{chargepump}$ may include the power loss due to operation of a pump used to provide lubrication to the transmission 16, $P_{transmloss}$ may include the power loss due to friction and heat in transmission 16, $P_{DTLoss}$ may include the power loss due to friction and heat in final drive 24 and differential 26, $\tau_{nonfriction}$ and $\tau_{parasitic}$ may include the pumping losses of operation of engine 14, N is the engine speed, and c is a constant (e.g., 5252) based on the units used in the equation.

According to some embodiments, this equation may be used to estimate the power loss associated with the road load (e.g., including power loss due resistance to motion based on parameters including, for example, aerodynamic drag, rolling resistance, and mechanical resistance). For example, transmission controller 30 may be configured to collect data associated with vehicle speed and the rate of vehicle deceleration for a number of data points and correlate the declaration with the vehicle speed. For example, transmission controller 30 may collect data at the following exemplary vehicle speed ranges: 9-10 mph; 19-20 mph; 29-30 mph; 39.5-40.5 mph, 49.5-50.5 mph. Other vehicle speed ranges are contemplated. Following collection of the coasting event data, transmission controller 30 may correlate vehicle deceleration rates with vehicle speed. Based on the estimated vehicle mass, deceleration rates, and vehicle speed, the road load may be estimated using the equation above and/or determining the best match among, for example, three, or more common road load curves corresponding to vehicle 10 applications. According to some embodiments, transmission controller 30 may use correlations between deceleration rate and vehicle speed for several common road load polynomial curves, and holding the current road grade estimation.

According to some embodiments, transmission controller 30 may be configured to estimate the road grade based on the following equations:

$$P_{grade}=P_{wheel}-P_{tract}-P_{roadload}; \text{ and } P_{tract}=m \times a \times (v/k),$$

where $P_{grade}$ includes the power loss due to the grade of the terrain on which vehicle 10 is travelling, $P_{tract}$ includes the tractive power, $P_{wheel}$ includes the power available at traction devices 22 (e.g., wheels), $P_{roadload}$ includes the power loss due to the road load, m is the vehicle mass, a is the vehicle acceleration, v is the vehicle speed, and k is a constant (e.g., 375) based on the units used in the equation. During acceleration of vehicle 10, the power input into transmission 16 may be determined based on information received from engine controller 28 or based on sensed information relating to the input and/or output of torque converter 18. The power available at the traction devices 22 may be calculated by subtracting estimated powertrain losses from the torque output of engine 14, which may be obtained either from engine controller 28 or based on signals from sensors associated with powertrain 12. Using estimates of vehicle mass and road load, the road grade may be estimated based on the equation above.

According to some embodiments, the transmission controller 30 may calculate transmission input torque $T_e$ from a torque converter table or torque map based on input and output speeds or by calculating engine output torque from the broadcasted vehicle bus messages based on the following equations $$T_e=(\tau_{indicated}-\tau_{nomfriction}-\tau_{parasitic}) \text{ [when torque converter lock-up clutch is engaged]}$$

$$T_e=R_c=T_p' \text{ [when in converter drive]},$$

where $R_c$ is the torque converter ratio based on correlation from, for example, torque converter maps, and $T_p'$ is the primary torque based on correlation from, for example, torque converter maps.

INDUSTRIAL APPLICABILITY

The disclosed system and method for selecting shift schedules may be used with any vehicle having a transmission configured to change gear ratios according to two or more shift schedules, which provide the shift points (e.g., the engine speeds at which gear ratio changes occur) for changing gear ratios of the transmission. The different shift schedules may provide desirable operational characteristics for the vehicle in different operating conditions.

For example, it may be desirable for the transmission to change gear ratios in a manner that provides improved efficiency. Under such conditions, it may be desirable for transmission 16 to change gear ratios according to a shift schedule that results in engine speed being relatively low when gear ratio changes occur. According to such an economy shift schedule, engine 14 operates at consistently lower engine speeds resulting in improved fuel efficiency. However, under different operating conditions, it may be desirable to operate transmission according to a shift schedule that results in engine 14 consistently operating at relatively higher engine speeds that correspond to higher power. As a result, according to a performance shift schedule, the shift points result in engine 14 operating at higher engine speeds prior to initiating a gear ratio change. According to some embodiments of the disclosed system and method for selecting shift schedule, the system and method may result in transmission controller 30 automatically selecting a shift schedule from two or more shift schedules that results in desirable operation of transmission 16 based on the operating conditions associated with vehicle 10.

Figure 4:
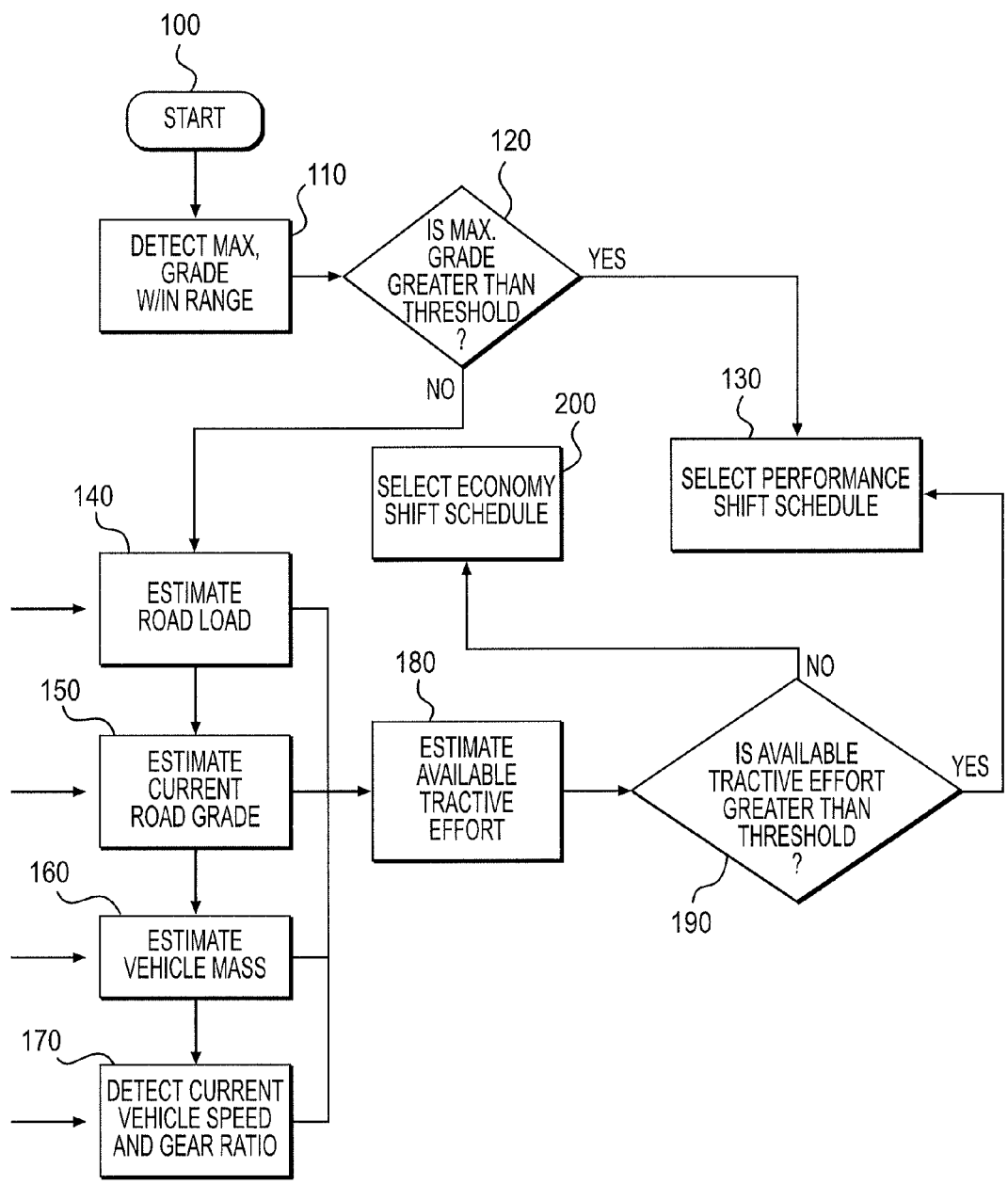
FIG. 4 is a flow chart depicting an exemplary method of selecting shift schedules of a transmission.

FIG. 4 shows a flow chart of an exemplary embodiment of a method of selecting a shift schedule. According to the exemplary embodiment shown in FIG. 4, the method begins at the start 100. Upon starting, at step 110, the system 29 may detect the maximum road grade within a certain range of vehicle 10 (e.g., grades greater than 4% detected within two miles of vehicle 10). Transmission controller 30 may be configured to receive signals from maps that provide maximum road grade information based on the current location of vehicle 10. At step 120, transmission controller 30 may compare the maximum road grade with a predetermined road grade value such as, for example, 4%. If the maximum road grade is greater than the predetermined road grade value, at step 120, transmission controller may select a performance shift schedule at step 130, which results in allowing engine 14 to achieve higher engine speeds prior to changing transmission 16 to the next higher gear ratio. However, if at step 120, the maximum road grade is less than or equal to the predetermined road grade, at step 140, transmission controller 30 may begin to estimate tractive effort by estimating road load at step 140, estimating the current road grade at step 150, estimating the mass of vehicle 10 at step 160, and detecting the current speed of vehicle 10 and the current gear ratio of transmission 16 at step 170. These determinations may be made according to the methods described previously herein.

Following the determinations of steps 140-170, transmission controller 30 may estimate the available tractive effort at step 180 according to the methods described previously herein. At step 190, transmission controller 30 may compare the estimated available tractive effort to a predetermined threshold that may be based on a predetermined percentage of the maximum available power at the current vehicle speed. For example, if the estimated available tractive effort is greater than 20% of the maximum available power, transmission controller 30 may select the performance shift schedule, as at step 130. If, on the other hand, the estimated available tractive effort is less than or equal to 20% of the maximum available power, at step 200, transmission controller 30 may select the economy shift schedule (step 200).

Thus, according to the exemplary method shown in FIG. 4, if vehicle 10 is within a certain range or distance of a road having a road grade greater than a predetermined grade, transmission controller 30 may select the performance shift schedule, such that transmission 16 delays changing to higher gears until engine 14 reaches relatively higher engine speeds corresponding to higher power output, which may be desirable for climbing the road grade. In contrast, if vehicle 10 is not within a certain range or distance of a road having a road grade greater than a predetermined grade, or if transmission controller 30 estimates the available tractive effort and selects a shift schedule based on whether the estimated tractive effort is greater than a predetermined threshold percentage of the maximum available power at the current vehicle speed, transmission controller 30 selects an economy shift schedule. Thus, if vehicle 10 has a relatively high estimated tractive effort due to, for example, vehicle 10 pulling or carrying a high payload, then transmission controller 30 selects a performance shift schedule so that shift points consistent with greater torque and power output of engine 14 may be achieved. In contrast, if vehicle 10 has a relatively low estimated tractive effort due to, for example, vehicle 10 being unloaded, then transmission controller 30 selects an economy shift schedule so that shift points consistent with greater efficiency associated with operation of engine 14 may be achieved.

It will be apparent to those skilled in the art that various modifications and variations can be made to the exemplary disclosed systems, methods, and vehicle. Other embodiments will be apparent to those skilled in the art from consideration of the specification and practice of the exemplary disclosed embodiments. It is intended that the specification and examples be considered as exemplary only, with a true scope being indicated by the following claims and their equivalents.

What is claimed is:

1. A system for selecting shift schedules of a transmission of a vehicle configured to change gears according to two or more shift schedules, the system comprising:
    a controller configured to:
        receive a signal indicative of acceleration of the vehicle prior to a change of a gear of the transmission;
        estimate tractive effort of the vehicle following the change of the gear of the transmission, the tractive effort estimation being based on at least an estimation of a road load on the vehicle and an estimate of vehicle mass, the vehicle mass estimation being based on acceleration of the vehicle after the change of the gear of the transmission; and
        select between a first shift schedule and a second shift schedule based on the tractive effort estimation,
    wherein, if the tractive effort estimation is less than a threshold value, the controller selects the first shift schedule, and if the tractive effort estimation is at least equal to the threshold value, the controller selects the second shift schedule.

2. The system of claim 1, wherein the controller is configured to estimate the road load based on at least one of aerodynamic drag of the vehicle and rolling resistance of the vehicle.

3. The system of claim 1, wherein the controller is configured to estimate tractive effort based on an estimate of road grade.

4. The system of claim 3, wherein the controller is configured to estimate the road grade based on the estimated vehicle mass and the estimated road load.

5. The system of claim 1, wherein the controller is configured to estimate the road load during a coasting event of the vehicle.

6. The system of claim 5, wherein the controller is configured to estimate the road load by correlating vehicle deceleration rates with vehicle speed.

7. The system of claim 1, wherein the controller is configured to estimate vehicle mass by:
    setting an initial vehicle mass estimate,
    estimating acceleration of the vehicle after the change of the gear of the transmission based on the initial vehicle mass estimate,
    determining acceleration of the vehicle after the change of the gear of the transmission, and
    adjusting the initial vehicle mass estimate based on a difference between the estimated acceleration and the determined acceleration.

8. The system of claim 7, wherein the controller is configured to repeatedly adjust the estimated vehicle mass until the estimated vehicle mass converges to within an estimate range.

9. The system of claim 1, wherein the first shift schedule is a performance shift schedule, and the second shift schedule is an economy shift schedule.

10. A method of selecting shift schedules of a transmission of a vehicle configured to change gears according to two or more shift schedules, the method comprising:
    measuring acceleration of the vehicle prior to changing a gear of the transmission;
    estimating tractive effort of the vehicle after changing the gear of the transmission, wherein estimating the tractive effort includes at least estimating a road load of the vehicle and estimating vehicle mass, wherein estimating the vehicle mass includes estimating vehicle mass based on acceleration of the vehicle after the change of the gear of the transmission; and
    selecting between a first shift schedule and a second shift schedule based on the estimated tractive effort,
    wherein, if the estimated tractive effort is less than a threshold value, the first shift schedule is selected and changing the gear of the transmission is delayed, and if the estimated tractive effort is at least equal to the threshold value, the second shift schedule is selected and changing the gear of the transmission is initiated.

11. The method of claim 10, wherein estimating the road load includes estimating at least one of aerodynamic drag of the vehicle and rolling resistance of the vehicle.

12. The method of claim 10, wherein estimating the tractive effort further includes estimating road grade.

13. The method of claim 12, wherein estimating the road grade includes estimating vehicle mass and estimating the road load of the vehicle.

14. The method of claim 10, wherein estimating the road load occurs during a coasting event of the vehicle.

15. The method of claim 14, wherein estimating the road load includes correlating vehicle deceleration rates during coastdown with vehicle speed.

16. The method of claim 10, further including estimating vehicle mass by:
    setting an initial vehicle mass estimate,
    estimating acceleration of the vehicle after the change of the gear of the transmission based on the initial vehicle mass estimate,
    determining acceleration of the vehicle after the change of the gear of the transmission, and
    adjusting the initial vehicle mass estimate based on a difference between the estimated acceleration and the determined acceleration.

17. The method of claim 16, further including repeatedly adjusting the estimated vehicle mass until the estimated vehicle mass converges to within an estimate range.

18. A vehicle comprising:
    a chassis;
    an engine coupled to the chassis;
    a transmission coupled to the engine and configured to change gears according to two or more shift schedules; and
    a controller configured to:
        receive a signal indicative of acceleration of the vehicle prior to a change of a gear of the transmission;
        estimate tractive effort of the vehicle following the change of the gear of the transmission, the tractive effort estimation being based on at least an estimation of a road load on the vehicle and an estimation of vehicle mass, the vehicle mass estimation being based on acceleration of the vehicle after the change of the gear of the transmission; and select between a first shift schedule and a second shift schedule based on the tractive effort estimation, wherein, if the tractive effort estimation is less than a threshold value, the controller selects the first shift schedule, and if the tractive effort estimation is at least equal to the threshold value, the controller selects the second shift schedule.

19. The vehicle of claim 18, wherein the controller selects the second shift schedule if the vehicle is within a predetermined range of a road having a grade greater than a predetermined grade.

20. The vehicle of claim 18, wherein controller is configured to estimate the road load based on at least one of aerodynamic drag of the vehicle and rolling resistance of the vehicle.

* * * * *